[19] United States Patent
Focke et al.

[11] Patent Number: 5,222,861
[45] Date of Patent: Jun. 29, 1993

[54] PROCESS AND APPARATUS FOR HANDLING CUP-SHAPED CONTAINERS

[75] Inventors: Heinz Focke, Verden; Johannes Holloch, Langwedel, both of Fed. Rep. of Germany

[73] Assignee: Focke & Co., (GmbH & Co.), Verden, Fed. Rep. of Germany

[21] Appl. No.: 764,854

[22] Filed: Sep. 24, 1991

[30] Foreign Application Priority Data

Sep. 24, 1990 [DE] Fed. Rep. of Germany ....... 4030215

[51] Int. Cl.⁵ ............................................. B65B 43/46
[52] U.S. Cl. .................................. 414/796.2; 294/65;
414/797; 414/416; 414/786
[58] Field of Search ............ 414/416, 797, 786, 796.2,
414/795.6; 294/64.1, 65

[56] References Cited
U.S. PATENT DOCUMENTS

| | | | |
|---|---|---|---|
| 2,903,290 | 9/1959 | Morris et al. | 414/416 X |
| 3,005,652 | 10/1961 | Helm | 294/64.1 |
| 3,318,068 | 5/1967 | Voullaire | 414/416 X |
| 3,472,403 | 10/1969 | Mueller et al. | 414/414 |
| 4,162,018 | 7/1979 | Arya | 414/416 X |
| 4,239,272 | 10/1981 | Jellema | 414/797 X |
| 4,402,173 | 9/1983 | Thierion | 414/416 X |
| 4,493,599 | 1/1915 | Hartness et al. | 414/796.2 |
| 4,547,115 | 10/1985 | Charbonnet | 414/797 X |
| 4,787,812 | 11/1988 | Göpfert | 294/64.1 X |
| 4,917,427 | 4/1990 | Scaglia | 294/64.1 |

FOREIGN PATENT DOCUMENTS

| | | | |
|---|---|---|---|
| 2144913 | 3/1973 | Fed. Rep. of Germany . | |
| 757878 | 1/1934 | France | 294/64.1 |
| 877099 | 9/1961 | United Kingdom | 414/416 |
| 2086866 | 5/1982 | United Kingdom . | |
| 2106070 | 4/1983 | United Kingdom . | |
| 2191468 | 12/1987 | United Kingdom | 294/64.1 |

Primary Examiner—David A. Bucci
Attorney, Agent, or Firm—Sughrue, Mion, Zinn, Macpeak & Seas

[57] ABSTRACT

The handling of cup-shaped containers (cups 10) for holding foods is difficult, as the cups (10) are delivered nested into one another in the form of a cup stack (14) in cartons. Hitherto, the cup stacks (14) formed by the cups (10) have been handled manually. A lifting and pivoting conveyor (25) with a gripper is used for an exclusively mechanical handling of the cups or cup stacks (14). The gripper (27) has holding mechanisms (31), each for engaging one cup stack (14). The holding mechanisms (31) of the gripper (27) are designed as suction chambers (32) with a lower suction opening (44) for engaging a cup stack (14) by negative pressure. In the region of the suction opening (44), sealing devices are attached to the suction chamber (32), especially an inner brush strip (48) and an outer rubber lip (50), which contact the critical contour of the cup stack (14) in a sealing manner.

15 Claims, 4 Drawing Sheets

PROCESS AND APPARATUS FOR HANDLING CUP-SHAPED CONTAINERS

BACKGROUND OF THE INVENTION

The invention relates to a process for feeding cup-shaped containers (cups) to a filling or packaging machine, the cups being stacked into one another in rows (cup stacks) and being delivered—surrounded by an inner wrapping—in cartons. Furthermore, the invention relates to an apparatus for conducting the process.

The cup-shaped containers completely or partially consist of deep-drawn (plastic) sheets. However, individual container parts, for example a container wall, may instead be made of thin cardboard. Normally, these cups are associated with lids which are placed on the cup by means of a clamping edge. These cups are mainly used for holding foods such as margarine.

Said cups and their lids—if any—are designed such that they can be stacked into one another so that rows of nested cups are formed which hereinafter will be called cup stacks.

Hitherto, the cups have been delivered in cartons which hold the cup stacks and corresponding lid stacks packed in an inner wrapping. The inner wrapping consists of a foil bag surrounding the complete contents. This foil bag is opened in the region of a processing machine (filling or packaging machine) and the cup and lid stacks are manually extracted and further conveyed.

SUMMARY OF THE INVENTION

The invention is based on the object to facilitate the handling of cup-shaped containers, and of their lids, in such a way that manual labour is reduced or avoided and the performance regarding the feeding of the cups to the processing machine is increased.

To attain this object, the process according to the invention is characterized in that the cups which are stacked in rows (cup stacks) are arranged in a stable outer carton accommodating an inner container for holding the cup stacks, said inner container being made of thin and relatively rigid material and corresponding to the contours of the outer carton, and in that the inner container is opened and the cup stacks arranged side by side and on top of one another are extracted in layers.

The system according to the invention manages without a packaging of the cups/lids in foil bags, as these are a hindrance when the packs are opened and the cups and lids are extracted. Nevertheless, the package for the cups and lids must not have any deficiencies in terms of food technology. According to the invention, this is ensured by the inner container which is made of dimensionally stable material such as thin cardboard, if required with a plastic coating to make the container dust-proof etc. The inner container can be opened like a carton, so that the entire top side of the packaging container, including the outer carton, is open. The cup and lid stacks can now be mechanically extracted.

According to the invention, the apparatus for emptying the containers which are holding the cup or lid stacks is equipped with a lifting means, especially a gripper which engages the cup stacks (lid stacks) of one layer as a whole and lifts them out of the packaging container (carton).

According to the invention, the gripper is designed in a special way and consists of holding means or mechanisms, each for one cup stack. The holding means engage the cup stacks, preferably over their entire length, with suction air. In a preferred embodiment, there is provided a suction chamber which extends approximately over the full length of a cup stack and is placed on the top side thereof. Specifically designed sealing means of the suction chamber ensure that an elongate and slit-like suction opening contacts the cup stack in a sufficiently sealing manner.

Further features of the invention relate to the structure of the gripper comprising the individual holding means for the cup stacks.

An exemplary embodiment of the invention will be explained below in more detail with reference to the drawings, in which:

DESCRIPTION OF A PREFERRED EMBODIMENT

Figure 1:
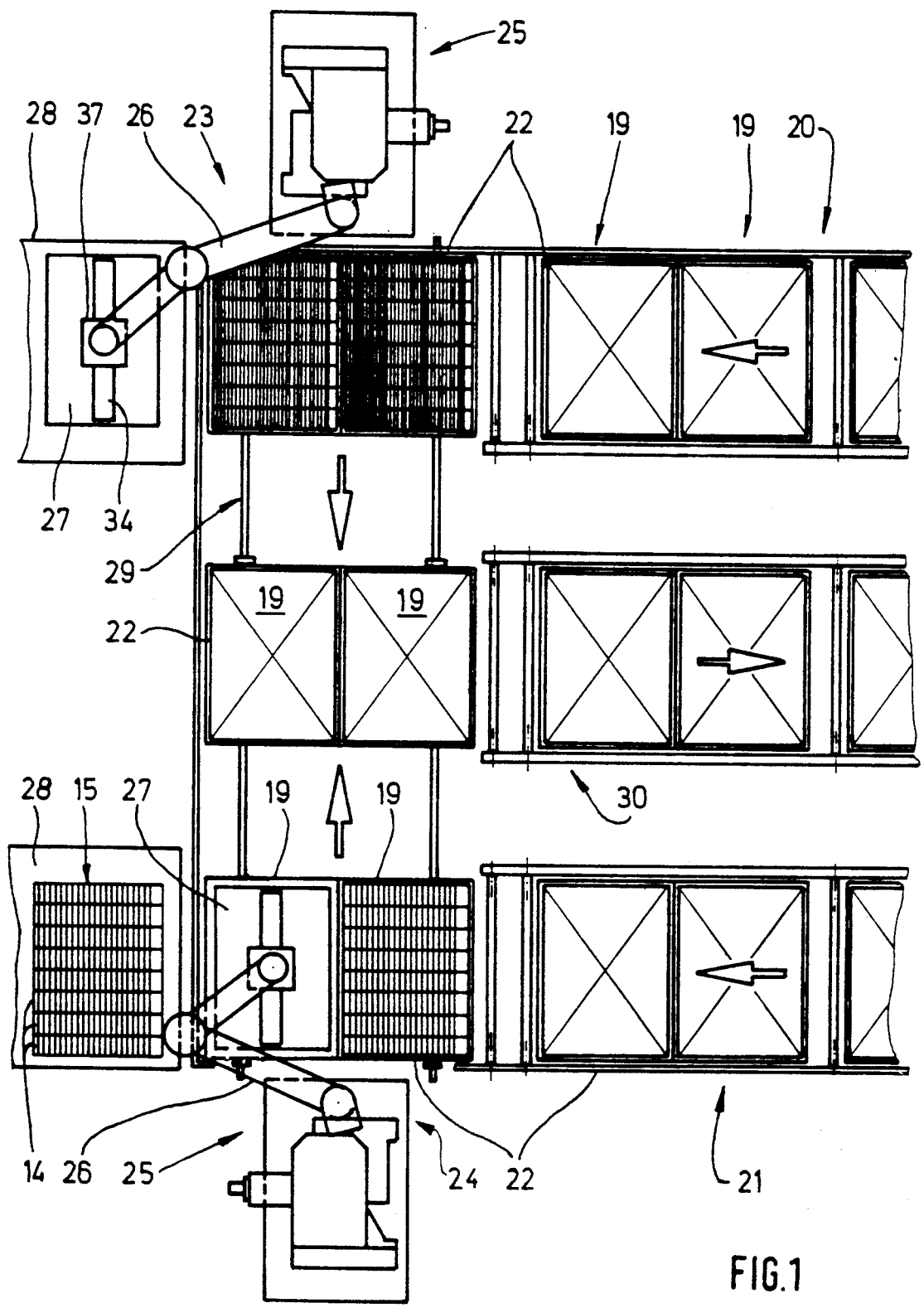
FIG. 1 is a plan view of an installation for feeding and handling packing cups and lids.

The embodiment illustrated is concerned with the handling of cups 10 (FIG. 2-4) made of deep-drawn plastic sheet and having a rectangular cross-section. The cups 10 are designed with side walls 12 converging towards a bottom wall 11. As a result, the cups can be tightly stacked into one another, such that formed upper edge strips 13 of the cups 10 rest against one another or are located adjacent to one another. A plurality of cups 10 being nested or stacked into one another in such a way forms a cup stack 14.

In the present case, the cups 10 are associated with lids (not illustrated in detail) which are also made by deep-drawing a plastic sheet. The lids are placed on the edge strip 13 of the cup 10 with a formed clamping edge. The cups 10—and correspondingly the lids—have a rectangular cross-section with strongly rounded upright edges. The cups 10 serve for holding foods, especially margarine.

The invention is concerned with the handling of the cups 10—and in analogy the lids—in the region of a filling or packaging machine. The cups 10 are supplied in a relatively large containers in which a plurality of cup stacks 14 are arranged on top of one another in layers 15. Each layer 15 consists of a plurality of cup stacks 14 located parallel side by side.

The packaging container for holding the cup stacks 14 is designed in a special way. In the present embodiment, it consists of an outer container, namely an outer carton 16 (FIGS. 2 and 3) which has relatively thick walls and is preferably made of (corrugated) cardboard having a thickness of 6 mm to 8 mm.

In the present case, the outer carton 16 is open at the top, but it may also be provided with closure flaps in the upper region.

With the outer carton 16, there is located an inner container 17 corresponding in size to the inner contours of the outer carton 16 and preferably being connected therewith. The inner container 17 is designed such that the cup stacks 14 can be stored and transported without any deficiencies in terms of food technology, and without additional packages such as foil bags. For this purpose, the inner container 17 is tightly closable by means of closure flaps 18. The inner container 17 can be made of cardboard having a small thickness (e.g. 3 mm). In any case, a certain dimensional stability of the inner container 17 is desirable. For reasons of food hygiene, the inner container 17 may be provided with a coating for protecting the contents.

To remove the cup stacks 14 from the transport container designed in this way, the inner container 17 is opened at the top, so that the cup stacks 14 of a layer 15 are completely exposed. The closure flaps 18 are slightly directed to the outside.

Now, the cup stacks 14 are removed without any manual labour. In each operating cycle, a complete layer 15 is removed from the container.

In the present embodiment, there is provided an emptying station as shown in FIG. 1 for exclusively mechanically emptying the packaging containers. This embodiment is designed for cups 10 which are associated with lids. Transport containers 19 which are designed in the described way are delivered on feed tracks 20 and 21, the former track 20 delivering transport containers 19 with cups and the latter track 21 delivering transport containers 19 with lids. The feed tracks 20, 21 are designed as roller tracks. Two transport containers 19 are supported on one pallet 22.

Each feed track 20, 21 is followed by an emptying station 23, 24 in which an automatically working lifting and conveying device, namely a pivoting conveyor 25, is arranged. In the packaging art, this pivoting conveyor 25 is also known as a robot or palletizer. The pivoting conveyor 25 is equipped with an articulated arm 26 which is movable up and down and pivotable. On the free end of the articulated arm 26, there is located a lifting means or a gripper 27 for engaging the articles to be transported.

The gripper 27 lifts one layer 15 of cup stacks 14 at a time out of the transport container 19 which is open at the top and deposits this layer 15 laterally next to the currently emptied pallet 22 on a conveyor or a table 28. After the transport containers 19 of one pallet 22 are emptied, said pallet 22 is discharged from the emptying station 23, 24 with the empty transport containers 19, specifically by means of a transverse conveyor 29, in the present case in the form of a chain conveyor. The emptied pallet (22) (with the emptied transport containers 19) is moved to a position between the two emptying stations 23, 24 where it is transferred to a discharge conveyor 30.

The gripper 27 of the pivoting conveyor 25 is designed in a special way. On the bottom side of the gripper 27, there are attached a plurality of holding means 31, corresponding in number to the number of cup stacks 14 in one layer 15. Each of these holding means 31 engages one cup stack 14.

In the present embodiment, the elongate cup stacks 14 are engaged by means of suction air (negative pressure) in the region of the holding means 31. For this purpose, each holding means 31 is provided with a suction chamber 32 extending in the form of an elongate hollow body in a direction parallel to the cup stacks 14. In the present embodiment, the holding means 31 or its suction chamber 32 is (nearly) as long as a cup stack 14.

Figure 2:
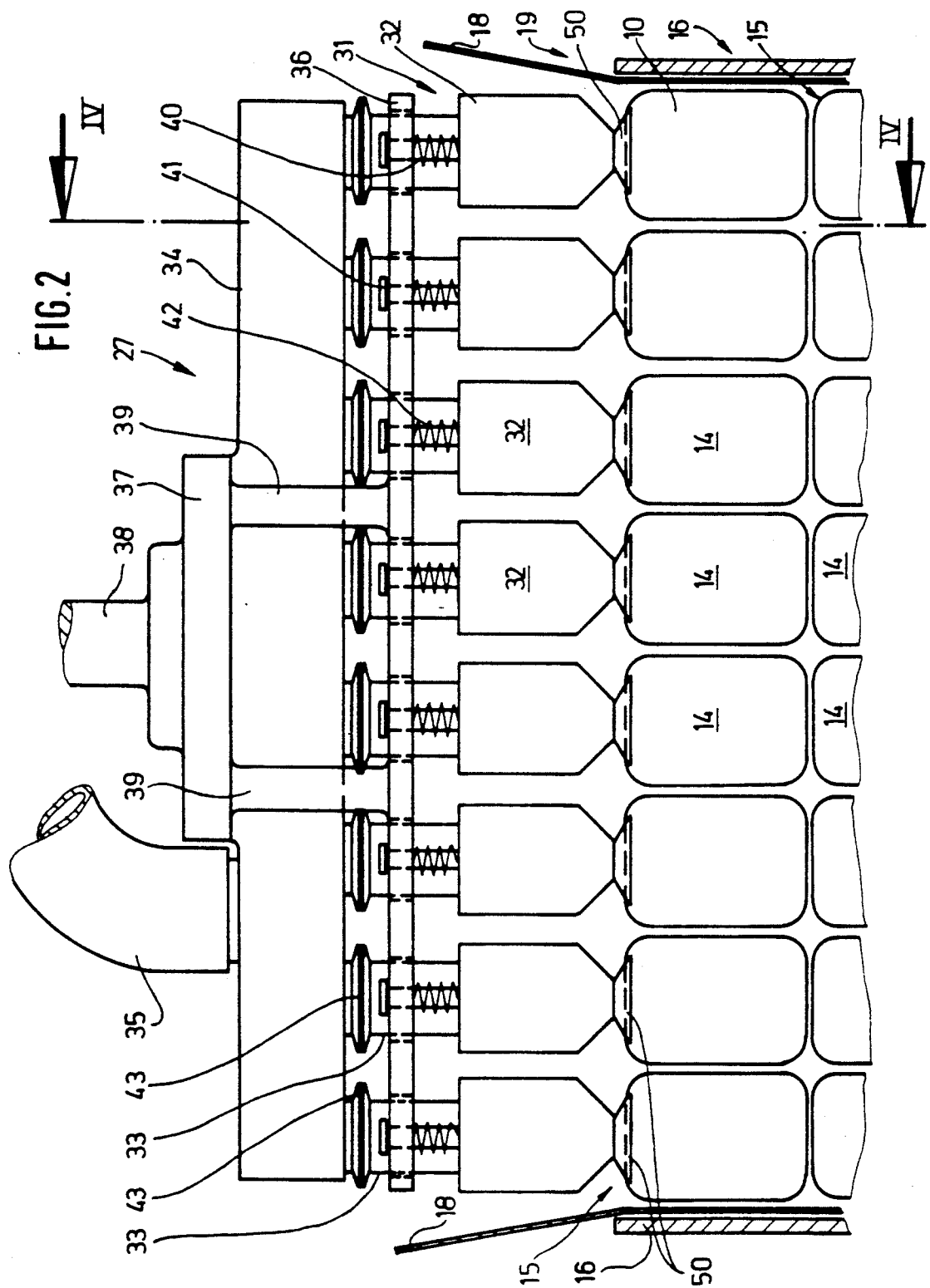
FIG. 2 is a side view of a gripper in operating position, acting as a lifting and conveying means for cup stacks.

A vacuum is generated in each suction chamber 32. For this purpose, a suction pipe 33 (FIG. 4) is centrally connected to the elongate housing of the suction chamber. This suction pipe 33 is linked to a central and transversely directed distributor chamber 34. The distributor chamber 34 extends transverse to the suction chambers 32. On the side located opposite the suction pipes 33, the distributor chamber 34 is connected to a central vacuum source (not illustrated in detail) via a vacuum line 35 (FIG. 2).

Figure 3:
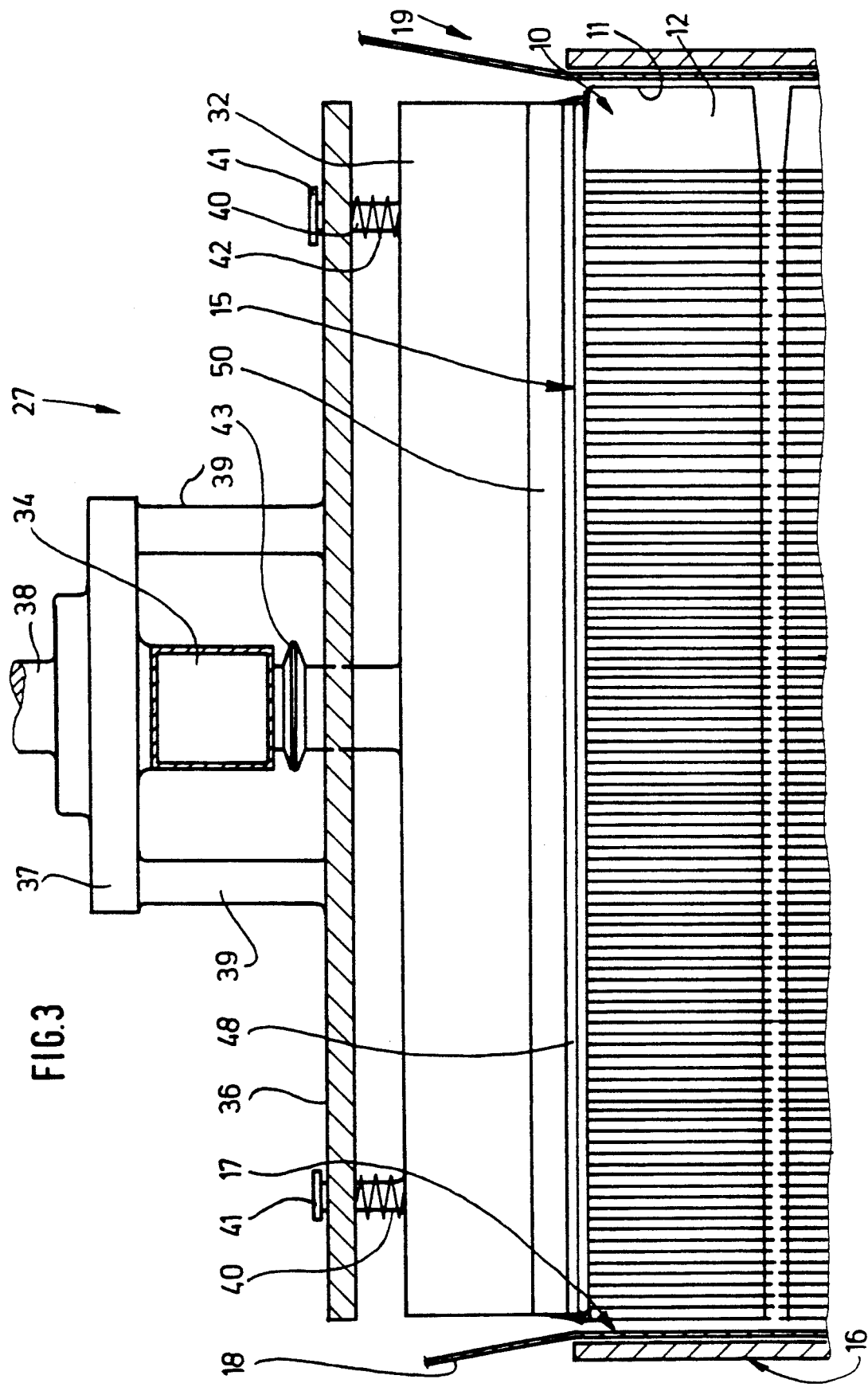
FIG. 3 is a side view, offset by 90° relative to FIG. 2, of a detail of the griper, namely a holding means for a cup stack.
Figure 4:
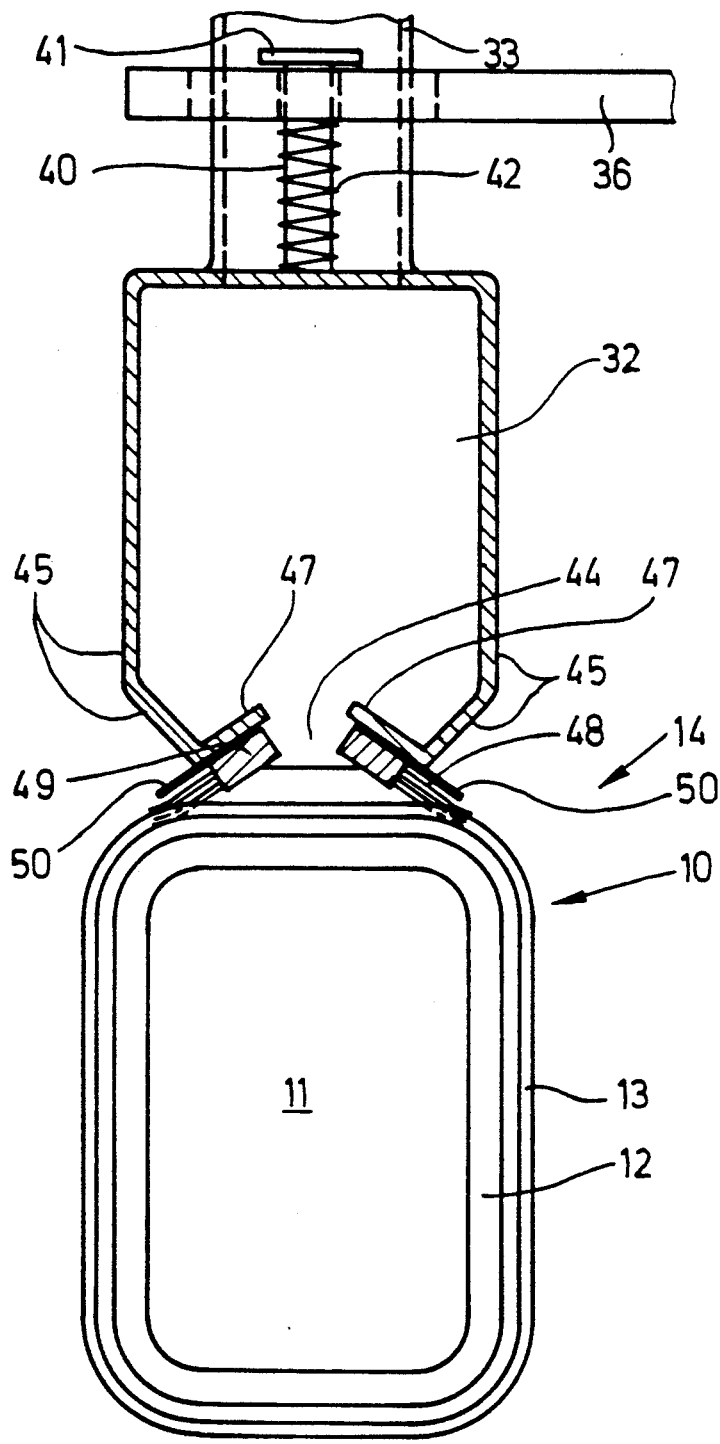
FIG. 4 is a vertical section of a holding means with a cup stack on an enlarged scale.

The holding means 31, that is to say their suction chambers 32, form a unit, namely the gripper 27. For this purpose, the holding means 31 or suction chambers 32 are arranged on a common support means, namely a supporting plate 36 which is attached to the articulated arm 26 of the pivoting conveyor 25. An adapter plate 37 is connected to an upright support piece 38 at the end of the articulated arm 26. The supporting plate 36 is connected to the adapter plate 37 via (four) stay bolts 39 (FIGS. 2 and 3). The distributor chamber 34 is attached to the bottom side of the adapter plate 37.

The holding means 31 or their suction chambers 32 are movably mounted on the supporting plate 36, to allow certain relative positions, especially inclined positions resulting from a respective design and/or storage of the cup stacks 14, when the suction chambers 32 are placed on the cup stacks. For this purpose, the suction chamber 32 is suspended from the supporting plate 36 via two support bolts 40. The support bolts 40 pass through the openings (bores) in the supporting plate 36 with a clearance and are held by a bolt head 41. Pressure springs 42 are arranged on the support bolts 40. These pressure springs 42 press the suction chambers 32 down and align them relative to the supporting plate 36. When the suction chambers 32 are in an inclined position, the pressure spring 42 are compressed accordingly. This connection of the suction chambers 32 with the support means (supporting plate 36) also ensures a resilient and elastic contact of the holding means 32 with the wall surface of the cup stack 14.

The suction pipes 33 are also designed for a movability of the suction chambers 32 relative to the supporting plate 36, specifically by means of bellow-type members 43 built into every suction pipe 33. These intermediate parts made of elastic material, especially rubber, and located within the divided suction pipes 33 allow movements of the lower portions of the suction pipes 33 relative to the distributor chamber 34.

The holding means 31 or their suction chambers 32 are designed in a special way to provide a suction-type connection with a cup stack 14. A suction opening 44 (FIG. 4) is arranged in the longitudinal centre on the bottom side of the suction chamber 32. In the present case, this opening is a continuous slit-like suction opening 44, so that the cup stack 14 can be engaged by means of negative pressure over its entire length. Alternatively, partial openings, bores or the like could be provided. The cross-section of the suction chamber 32 is designed such that the suction chamber walls 45, 46 extend in a converging manner in the lower region. Legs 47 are formed at the ends of these walls and are directed upwards, i.e. to the inside of the suction chamber 32. The slit-like suction opening 44 is formed between the upper edges of the legs 47 and thus has a downwardly increasing width as a result of the downwardly diverging legs 47.

Deformable elastic sealing means are arranged on either side of the suction opening 44 and contact the wall surface of a cup stack 14 in a sealing manner for engaging the cup stack 14. In the present embodiment, a first sealing means in the form of a brush strip 48 (FIG.

4) is provided to act as a direct contact means for the cup stack 14. This brush strip 48 consists of a strip body 49 with a continuous brush attached thereto. The bristles of this brush contact the wall surface of the cup stack 14. The brush strips 48 are arranged to downwardly diverge, i.e. towards the cup stack 14, as a result of the corresponding orientation of the legs 47. In the present embodiment, these brush strips 48 are provided only in the region of the longitudinal extension of the cup stack 14 and the holding means 31.

Elastic rubber members, namely rubber lips 50 directly abut the legs 47 of the suction chamber 32. These rubber lips extend all around the suction opening 44, i.e. in the longitudinal direction thereof and at the ends in the transverse direction. The rubber lips 50 are attached to the leg 47 of the suction chamber 32 with the strip body 49. Consequently, the arrangement has been designed such that the rubber lip 50 is on the outside relative to the cup stacks 14. Under negative pressure, the rubber lips 50 are sucked against the bristles of the brush strip 48. The rubber lips 50 have smaller dimensions (width) than the brush strip 48, so that the outer free edges of the rubber lip 50 do not project beyond the bristles of the brush strip 48.

To pick up a layer 15 of side by side cup stacks 14, the gripper 27 is lowered onto the respective uppermost layer 15, such that each holding means 31 contacts one cup stack 14. In this process, the sealing means 48 and 50 contact the upper wall surface of the cup stack 14 on either side of the suction opening 44. When suction air is generated, the bristles of the brush strip 48 enter the spaces between adjacent cups 10 or between adjacent edge strips 13 and thus form a seal in this region. The bristles of the brush strip 48 will mainly enter gaps between the adjacent edge strips 38. The rubber lip 50 then contacts the bristles of the brush strip 48 or the edges of the cups 10 from the outside, so that a seal is formed which is sufficient for engaging the cup stack 14.

To deposit the cup stacks 14, the suction chambers 32 only have to be ventilated which automatically releases the cup stacks 14 from the holding means 31.

We claim:

1. In a process for feeding cups (10) to a filling or packaging machine, the cups being stacked into one another to form cup stacks (14) and being delivered, surrounded by an inner wrapping, in cartons to the machine, the improvement comprising the steps of:
   providing a stable outer carton (16);
   wrapping a plurality of the cup stacks (14) in an inner container (17), made of thin and relatively rigid material and corresponding to the inner contours of the outer carton (16), so that the cup stacks are arranged side by side and in layers on top of one another;
   opening a top side of said inner container; and
   extracting, with a gripper (27), the cup stacks (14) from said inner container (17) in layers and depositing the extracted layers outside said outer carton (16).

2. The process as claimed in claim 1, further comprising:
   making the outer carton (16) of thick cardboard and open at a top side thereof; and
   making the inner container (17) of thin-walled dimensionally stable material is closed on all sides (before it is opened).

3. The process as claimed in claim 1, comprising arranging the gripper (27) on an articulated supporting arm (26) of a pivoting conveyor, and providing the gripper (27) with separate holding means (31), each assigned to one cup stack (14), for engaging and extracting one cup stack (14) each.

4. An apparatus for feeding cups (10) to a filling or packaging machine,
   wherein a plurality of cups (10) having diverging side walls (12) are stacked into one another positively to form a cup stack (14) having a length extending in a longitudinal direction,
   wherein, in a transport container (19), which has an open top, a plurality of cup stacks (14) are located side by side to form a layer (15), and a plurality of layers (15) are located on top of one another, said apparatus comprising:
   means for delivering to the machine a container (19) containing the layers (15) of cup stacks (14);
   a gripper means (27) for engaging, lifting and extracting from the container (19) the cup stacks (14) one layer at a time, and depositing the layers outside the transport container (19); and
   said gripper means including a separate elongate suction chamber having a suction opening (32) associated with each cup stack (14) and extending over the entire length of the cup stack (14) at upwardly directed longitudinal sides thereof.

5. The apparatus as claimed in claim 4, wherein the gripper means (27) is arranged on an articulated supporting arm (26) of a lifting and pivoting conveyor.

6. The apparatus as claimed in claim 5, wherein the gripper means (27) has a plurality of suction chambers (32) which correspond in number to the number of cup stacks (14) in each layer (15), said suction chambers (32) extending in the direction of the cup stacks (14) and having at least one slit-like suction opening (44) on a bottom side thereof, and further comprising means for supplying suction air to said suction chambers.

7. The apparatus as claimed in claim 6, wherein the suction chambers (32) are movable and are shiftably arranged on a common supporting plate (36).

8. The apparatus as claimed in claim 6, wherein the suction chambers (32) are mounted on a common supporting plate (36) connected to the articulated arm (26) via stay bolts (39) with an adapter plate (37).

9. The apparatus as claimed in claim 8, wherein each suction chamber (32) is linked to a distributor chamber (34) via one of a plurality of suction pipes (33), said distributor chamber (34) being attached to the articulated arm (26) or the adapter plate (37) thereof, said suction pipes (33) being elastically deformably and variable in length.

10. The apparatus as claimed in claim 6, wherein, in a region of the suction opening (44), the suction chambers (32) are provided with sealing means, surrounding said suction opening (44), for engaging a cup stack and contacting the cup stack (14) in a sealing manner as a result of negative pressure in said suction chamber (32).

11. The apparatus as claimed in claim 10, wherein the suction opening (44) is limited by downwardly diverging legs (47) of suction chamber walls (45, 46) which are directed inwardly of each suction chamber (32), the sealing means (48, 50) being attached on an outer side of said legs (47).

12. The apparatus as claimed in claim 10, wherein the sealing means comprises two interacting and abutting sealing devices in the form of a brush strip (48) confronting the cup stack (14) and a rubber lip (50) resting against the brush strip on an outer side thereof.

13. An apparatus including means for feeding cups (10), which are stacked into one another to form cup stacks (14) extending in a longitudinal direction, to a filling or packaging station, the cup stacks (14) being delivered, surrounded by an inner wrapping, to the station in a transport container (19) which is open at the top, the cup stacks (14) being arranged on top of one another, said apparatus comprising:
- a gripper (27) for engaging, lifting and extracting from the open container (19) the cup stacks (14), a layer (15) at a time, and depositing the extracted layers (15) outside the container (19);
- a lifting and pivoting conveyor (26) on which said gripper (27) is mounted;
- a plurality of elongate suction chambers (32) in said gripper and corresponding in number to the number of cup stacks (14) in each layer (15), each cup stack (14) being associated with a different one of said suction chambers (32), and said suction chambers (32) extending in the longitudinal direction of the cup stacks (14) and having at least one elongated suction opening (44) on a bottom side thereof;
- a common supporting plate (36) on which said suction chambers (32) are movably mounted; and
- an adapter plate (37) with support bolts (40) for suspending said suction members (32) from said adapter plate, with spring members (42) being arranged on the support bolts (40) to load the suction chambers (32) in a direction of a lower end position.

14. An apparatus including means for feeding cups (10) which are stacked into one another to form cup stacks (14) extending in a longitudinal direction, to a filling or packaging station, the cup stacks (14) being delivered, surrounded by an inner wrapping, to the station in a transport container (19) which is open at the top, the cup stacks (14) being arranged on top of one another, said apparatus comprising:
- a gripper (27) for engaging, lifting and extracting from the open container (19) the cup stacks (14), a layer (15) at a time, and depositing the extracted layers (15) outside the container (19);
- a lifting and pivoting conveyor (26) on which said gripper (27) is mounted;
- a plurality of elongate suction chambers (32) in said gripper and corresponding in number to the number of cup stacks (14) in each layer (15), each cup stack (14) being associated with a different one of said suction chambers (32), and said suction chambers (32) extending in the longitudinal direction of the cup stacks (14) and having at least one elongated suction opening (44) on a bottom side thereof;
- wherein in a region of the suction opening (44), each of the suction chambers (32) is provided with sealing means surrounding said suction opening (44) and contacting a cup stack (14) in a sealing manner as a result of negative pressure applied to the suction chamber; and
- wherein the sealing means comprises two interacting and abutting sealing devices in the form of a brush strip (48) confronting the cup stack (14) and a rubber lip (50) resting against the brush strip on an outer side thereof.

15. An apparatus including means for feeding cups (10), which are stacked into one another to form cup stacks (14) extending in a longitudinal direction, to a filling or packaging station, the cup stacks (14) being delivered, surrounded by an inner wrapping, to the station in a transport container (19) which is open at the top, the cup stacks (14) being arranged on top of one another, said apparatus comprising:
- a gripper (27) for engaging, lifting and extracting from the open container (19) the cup stacks (14), a layer (15) at a time, and depositing the extracted layers (15) outside the container (19);
- a lifting and pivoting conveyor (26) on which said gripper (27) is mounted; and
- a plurality of elongate suction chambers (32) in said gripper and corresponding in number to the number of cup stacks (14) in each layer (15), each cup stack (14) being associated with a different one of said suction chambers (32), and said suction chambers (32) extending in the longitudinal direction of the cup stacks (14) and having at least one elongated suction opening (44) on a bottom side thereof;
- wherein the sealing means comprises elastic strip-like sealing members arranged, in a cross-sectional view of each suction chamber (32), downwardly diverging at an obtuse angle to one another;
- wherein the sealing means comprises two interacting and abutting sealing devices in the form of a brush strip (48) confronting the cup stack (14) and a rubber lip (50) resting against the brush strip on an outer side thereof; and
- wherein the rubber lip (50) extends all around the suction opening (44), whereas the brush strip (48) is arranged only on longitudinal sides of the elongated suction opening (44).

* * * * *